United States Patent [19]
Arnold et al.

[11] 3,964,525
[45] June 22, 1976

[54] MECHANISM FOR USE IN WINDING APPARATUS

[75] Inventors: Richard B. Arnold; Dallas F. Smith, both of Fort Wayne, Ind.

[73] Assignee: General Electric Company, Fort Wayne, Ind.

[22] Filed: May 7, 1975

[21] Appl. No.: 575,225

Related U.S. Application Data

[60] Continuation-in-part of Ser. No. 359,502, May 11, 1973, abandoned, which is a division of Ser. No. 130,399, April 1, 1971, Pat. No. 3,732,897.

[52] U.S. Cl. ............................................. 140/92.1
[51] Int. Cl.² ........................................... B21F 3/04
[58] Field of Search ..................... 140/1, 92.1, 92.2; 242/25, 47.01, 78, 82; 57/71

[56] References Cited
UNITED STATES PATENTS

| | | | |
|---|---|---|---|
| 1,187,827 | 6/1916 | Gibbs | 242/82 |
| 2,445,109 | 7/1948 | Ferguson | 242/7.09 |
| 2,836,204 | 5/1958 | Mason | 140/92.1 |
| 2,889,610 | 6/1959 | Buddecke | 140/92.2 |
| 3,579,791 | 5/1971 | Arnold | 140/92.1 |
| 3,625,261 | 12/1971 | Hill et al. | 140/92.1 |

FOREIGN PATENTS OR APPLICATIONS

| | | | |
|---|---|---|---|
| 1,045,343 | 12/1958 | Germany | 242/82 |
| 852,297 | 10/1960 | United Kingdom | 57/58.3 |

*Primary Examiner*—Lowell A. Larson
*Attorney, Agent, or Firm*—Ralph E. Krisher, Jr.

[57] ABSTRACT

Mechanism for use in high speed winding machines used for developing coil groups each comprising one or more coils each having one or more turns of winding material. The apparatus may be advantageously utilized in the manufacture of wound inductive devices, e.g., dynamoelectric machines such as motors. Mechanism prevents rotation of a coil form while a flyer rotates and generates winding turns about the coil form. Mechanism may be a migrating linkage having a carriage which supports a wobble face gear having teeth on opposite faces thereof. Teeth on one face of the wobble gear mesh with the stationary gear teeth on the frame while teeth on the other face of the wobble gear engage the gear on the coil form support. As a carriage rotates with the flyer, wobble gear executes a rotationless wobble motion synchronized with the flyer. This motion results in a moving shutter, synchronized with the flyer, through which wire is fed to the flyer. In preferred forms, the mechanism includes a first meshing surface carried by the machine frame; a second meshing surface fastened to or forming a part of a winding form mechanism; and a locking structure supported to accomplish a meshing engagement with the first and second meshing surfaces. The locking structure may be a deformable spline that meshes with the first and second gear surfaces. In another form, the above mentioned carriage may rotate about a first given axis and may support at least one pair of gear surfaces for rotation about a second axis of rotation generally parallel to the first given axis. For example, a pair of gears locked or keyed on a common shaft parallel to but removed from the flyer axis of rotation may be used. The at least one pair of gears would be supported by and rotate with the flyer structure. The gears of such pair would then mesh, respectively, with a gear structure fastened to the machine frame, and with a gear interconnected with a coil form or coil form support. In one of the other forms, strain wave gearing means may be used so as to provide an exit path, preferably generally radially extending for wire that is fed generally axially to mechanisms embodying the invention.

19 Claims, 10 Drawing Figures

MECHANISM FOR USE IN WINDING APPARATUS

CROSS REFERENCE TO RELATED APPLICATIONS

This application is a continuation-in-part of our allowed co-pending application Ser. No. 359,502 (now abandoned) which is titled "Mechanism For Use In Winding Apparatus," and which was filed on May 11, 1973, as a division of our then co-pending application Ser. No. 130,399 (now U.S. Pat. No. 3,732,897) which had been previously filed on Apr. 1, 1971.

BACKGROUND OF THE INVENTION

The present invention relates generally to improved mechanisms for use in an apparatus for developing one or more coils in one or more coil groups — for example, a machine for developing coils that may be used as the winding in an inductive device such as a dynamoelectric machine. More specifically, the present invention relates to mechanisms that provide means for synchronizing a wire accommodating opening or shutter with movement of a flyer.

One prior art winding machine arrangement is illustrated in Smith U.S. Pat. No. 3,510,939. This patent illustrates winding coils on a coil form which is supported by an axially movable support member which in turn is coaxial with and internal to a flyer drive shaft. A flyer coupled with the drive shaft is rotatable about a central axis and develops coils of wire on the coil form. Developed coil turns are transferred from the free end of the coil form to a coil receiver either while other turns in the same coil are being developed or upon completion of the development of a given coil.

After having received the coil turns, the coil receiver is moved to a coil inserting or coil inject machine such as that disclosed in the Hill U.S. Pat. No. 3,324,536. Since a number of different size coils for a given coil group to be used to form one pole of an electric motor are often developed on a single form, the coil form is provided with steps or stages and relative axial movement between the form and flyer is effected so as to develop the different coils within a coil group.

In the aforementioned Smith machine, the form is moved in several steps, and may begin with the form retracted toward the head structure of the machine. Then, as all of the turns for one coil are developed, the form would be moved one incremental step toward the coil receiver and the turns of a second coil would be developed. This stepping process would be repeated until a coil group for one pole would have been developed. This stepping process, of course, requires the coil form support structure to be movable axially.

The drive shaft which imparts rotary motion to the flyer is a tubular shaft surrounding the support shaft for the coil form and wire is fed from a wire source along this tubular drive shaft to the flyer. This wire feed path is preferably kept close to the axis of the flyer drive shaft and coil form support so as to prevent undue stresses caused by bending and/or twisting of the wire as the flyer and drive shaft rotate.

There have been provided a series of stops which establish and control the incremental axial movement of the coil form and relatively complex means for preventing rotation of the coil form support structure. One way to prevent the rotation of the coil form would be to provide a holding mechanism for cooperation with the free or unsupported end of the coil form, but such an arrangement would interfere with the desired interrelationships between the coil form and coil receiver and particularly would interfere with the movement of developed coil turns to the coil turn receiver.

In the aforementioned Smith patent one disclosed means for preventing rotation of a coil form included pairs of cam operated shuttle bars which sequentially locked the coil form support structure to the machine frame while providing a gap between the coil form support structure and the machine frame opposite the instantaneous shuttle bar locking point through which gap wire could be fed to the flyer. As the flyer rotated, the shuttle bars reciprocated between diametrically opposed locking points and thus accelerated in a first direction, stopped and latched, and then accelerated in a direction opposite to the first, stopped and latched again for each revolution of the flyer. While quite effective, the stresses and vibrations due to inertial forces involved with this arrangement established, as a practical matter, an upper limit to the speed of operation of the entire apparatus.

Cam operated shuttle bars were also utilized in our application Ser. No. 806,057, filed Mar. 11, 1969, and entitled "Method And Apparatus for Forming Shaped Insulators And For Developing Coils Of A Magnetic Core," which issued May 25, 1971, as U.S. Pat. No. 3,579,818. To prevent rotation of a coil form with a flyer as disclosed in our U.S. Pat. No. 3,579,818, a coil form cooperates with an insertion tooling mechanism, e.g., injection tooling. It will be appreciated that in addition to limiting speed of operation, linearly reciprocating shuttle bars will also be a continuing cyclical stress generating source at all speeds of operation and will thus have a tendency at least to be a source of undesired noise as well as vibrations which can have a continuing deleterious affect over a period of time on other parts of the apparatus, including for example, hydraulic and pneumatic seals and connections, electrical connections, and mechanical elements and adjustments.

Although the foregoing background description has been in connection with apparatus and methods that are of particular utility in the dynamoelectric machine winding art, it will be appreciated that it would be desirable to provide an improved machine that may be utilized to overcome similar or related problems in other applications.

Accordingly, it is a general object of the present invention to provide improved wire path establishing mechanisms for winding machines.

It is another object of the present invention to provide a mechanism that establishes a continuously moving opening for the movement of winding material therethrough with the mechanism stopping and starting only when a winding flyer stops and starts during winding machine operation.

Still another object of the present invention is to provide a mechanism that includes means extending between axially spaced apart first and second members for preventing relative rotation between the first and second members while allowing rotation of a wire handling structure which lies axially between the first and second members and extends radially beyond the axis of rotation of the wire handling structure.

It is a further object of the present invention to eliminate at least some of the inertial shock loads associated with reciprocating rotation preventing structures used heretofore with coil winding machines.

A more specific object of the present invention is to provide a moving shutter mechanism movable continuously with the flyer of a winding machine through which winding material is fed to the flyer.

SUMMARY OF THE INVENTION

In accordance with one form of our invention, we have provided an improved mechanism that establishes a path for winding material while winding material is fed to a rotating flyer. The material is fed along a path generally parallel and in proximity to an axis of rotation of the machine and radially away from the axis of rotation between a first stationary machine element or mechanism and a second machine element or mechanism restrained from synchronous movement with the flyer by shutter means which extent between and constantly engage the first and second machine elements. In a preferred form, the first machine element includes a first meshing surface in the form of a face gear, held fixed relative to the machine frame. The second machine element includes a meshing surface in the form of a second face gear secured to a coil form, and the shutter means is in the form of an intermeshing member having two spaced apart oppositely facing surfaces each of which respectively engage and mesh with the face gears. With the two face gears lying in spaced apart parallel planes, the intermeshing member lies in a plane intersecting the two parallel planes and is supported by a nonrotatable bearing race which is eccentrically supported relative to the axis of rotation by a bearing race which rotates in synchronism with the flyer. During machine operation, the nonrotatable bearing race executes a rotationless wobble motion which is imparted to the intermeshing member. The intermeshing member then defines a shutter synchronously movable with the flyer, through which winding material is fed to the arm of the flyer. In this preferred embodiment, linearly reciprocating masses are avoided in the shutter defining means and undesirable ramifications thereof, such as vibration, and cyclical inertial stresses are substantially eliminated.

The subject matter which we regard as our invention is particularly pointed out and distinctly claimed in the concluding portion of the specification. Our intention itself, however, both as to its organization and method of operation, together with further objects and advantages thereof, may best be understood by reference to the following description taken in connection with the accompanying drawings.

DESCRIPTION OF THE PREFERRED EMBODIMENT

Figure 1:
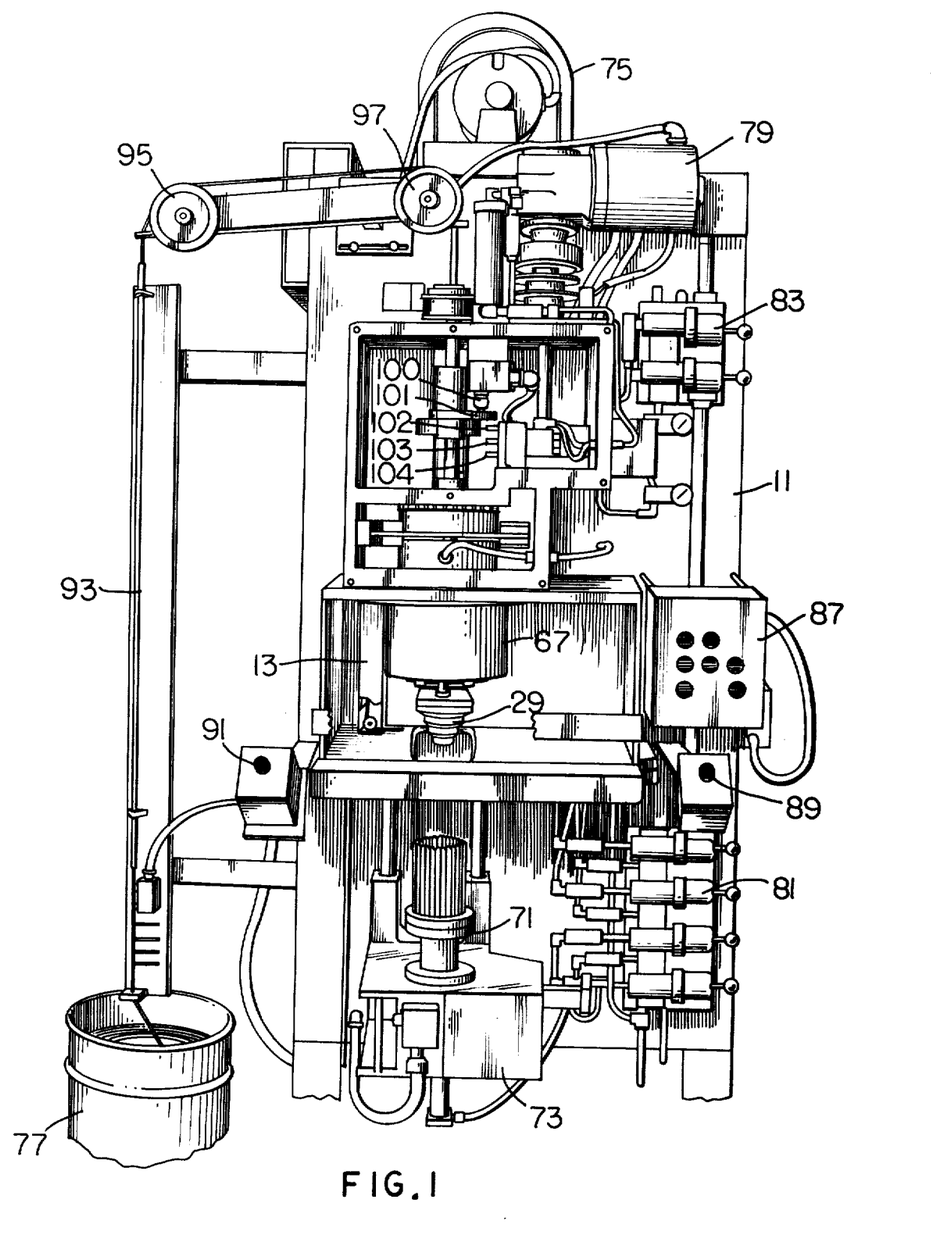
FIG. 1 is a front perspective view of a winding machine with a mechanism embodying the present invention in a preferred form.

With reference to FIG. 1, a coil winding machine particularly adapted for developing winding coil turns for dynamoelectric machine stators and showing the present invention, in one form, includes a machine frame 11 which supports auxiliary coil shaping means illustrated as a coil form 29 about which flyer means including flyer arm 13 is rotatable. The axis of revolution 15 (best seen in FIG. 2) of the flyer 13 may be horizontal but as illustrated is vertical as in the case of the flyer in the apparatus shown in our application Ser. No. 806,057, the entire disclosure of which application is specifically incorporated herein by reference. The coil form 29 of the machine 11 has sections for interfitting and cooperating with coil receiving means that, as illustrated, include the vertically extending blades of a coil transfer mechanism 71. This mechanism is supported by a vertically movable transfer mechanism support structure 73. The structure 73 is operative to raise the coil transfer mechanism into intermeshing relationship with the coil form 29 for receiving developed winding turns. When a coil group for one pole of a stator has been received in the transfer mechanism, the support structure 73 rotates the coil transfer mechanism in preparation for receiving the coils developed for another coil group.

When the transfer mechanism has received all of the coils which are to be subsequently assembled with a magnetic core, for example, inserted into the slots of a dynamoelectric machine core, the support 73 lowers somewhat so that the transfer mechanism 71 may be removed by an operator and transferred to a coil insertion station. Many of the principles of overall operation of the winding machine 11 are similar to those of the aforementioned Smith device although the machine axis 15 is vertical rather than horizontal and may, of course, include structural arrangements disclosed in our aforementioned copending application. For example, coil injection tooling or still other coil turn receiver means may receive coil turns developed from wire fed to the flyer 13.

A pair of electric motors 75 and 79 supply the power requirements of the present machine either by way of direct mechanical linkages such as a belt drive to the flyer mechanism 13 from the motor 75 or by a pneumatic system controlled for example by solenoid operated valves such as the valves in the valve banks 81 and 83 which serve to gate energy from a pressurized fluid supply to the pneumatically operated mechanisms within the machine 11. The pressure fluid system and controls in the machine 11 may be arranged for pneumatic or hydraulic operation, but in either case the physical operation and control is basically as described in Smith U.S. Pat. No. 3,510,939. The mechanism which rotates the transfer mechanism 71 is a pneumatic drive mechanism controlled by one of the valves in the valve bank 81 which, as will be understood, in turn is energized by a not shown logic circuit upon the completion of the development of a coil group. As best shown in FIG. 1, a pneumatic cylinder 100 is operative, upon actuation of the proper valve in valve bank 83, to drive a bearing plate 101 carried by the coil form jump tube 50 (better shown in FIG. 2) against retractable stops 102, 103, 104. During operation, the coil form or arbor 29 is jumped downwardly upon sequential retraction of the stops 102, 103, 104 which also are pneumatically controlled. As viewed in FIG. 1, however, the cylinder 100 has retracted the bearing plate 101 to its uppermost initial position. There are numerous other control functions performed in a complete cycle of operation of the machine 11. However, these other control functions either are well-known in the art or fully described in the aforementioned Smith patent and our copending application.

Also illustrated in FIG. 1 is a control panel 87 by means of which an operator may, for example, set the number of turns required for each coil in a coil group. Machine operation is initiated by simultaneous two handed energization of the switches 89 and 91. A wire source such as a large drum 77 supplies wire along a wire guide 93 around two pulleys or other wire guides 95 and 97 and then downwardly substantially parallel to and adjacent to the axis 15 of rotation of the flyer 13 to the flyer.

Figure 2:
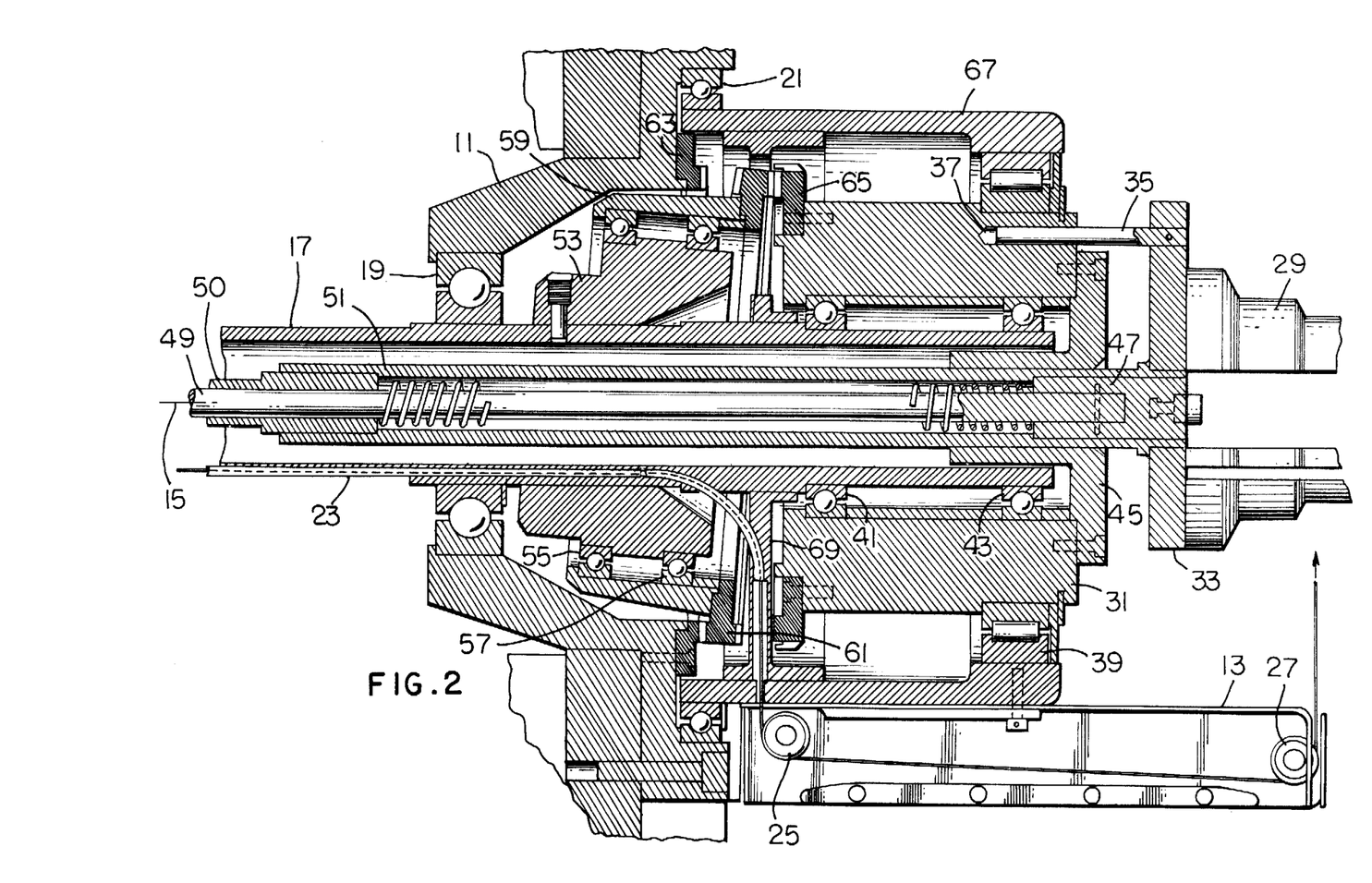
FIG. 2 is an elevational view partly in section of the winding head portion of the machine of FIG. 1.

Turning now to FIG. 2, the flyer 13 is rotatably driven about the axis 15 by a tubular flyer drive shaft 17 which in turn is driven, for example, by the electric motor 75 of FIG. 1. The entire flyer means including the flyer 13, the drive shaft 17 and flyer supporting structure 67 and 69 is illustrated cross hatched throughout in the same manner to more clearly show which portions of the machine rotate together. The entire flyer means is rotatably supported by the frame by way of rotary bearings 19 and 21. Wire from the source 77 shown in FIG. 1 is fed along the tubular drive shaft in a wire passage 23 which eventually bends and progresses radially outwardly along the structure which affixes or couples the actual flyer 13 to the flyer drive shaft 17. This wire feed path is then deviated twice within the flyer by two wire guides 25 and 27. From this last wire guide 27 the wire is fed as the flyer rotates and coil turns are developed about the coil form 29.

The coil form 29 is secured to a base 33 locked against rotation relative to a second member 31. The coil form base 33 is movable axially relative to the second member 31 but relative rotation of these two portions of the coil form support means is prevented by a pin 35 secured to the base 33 which mates with a corresponding hole 37 in the base 33 of the coil form support structure, the hole 37 extending sufficiently far into the second member 31 to allow the desired amount of relative axial motion between the members 31 and 33 and yet prevent any rotation therebetween. The coil form support structure 31 remains stationary while the flyer 13 rotates in order to promote the desired development of coil turns, this relative rotation being allowed while maintaining rugged support for the coil form and flyer by a series of rotary bearings, 39, 41, and 43.

Sleeve bearings 45 and 47 allow relative axial motion between the base 33 and second member 31. An axial rod 49 is the innermost of a series of concentric members 49, 51, and 17 which extend generally along the axis 15. The axial rod 49 is movable axially relative to the coil form 29 to ensure that all of the coil turns developed during a coil winding cycle are received in the coil receiving means. The axial rod 49 and jump tube 51 may be moved together axially to move the coil form 29 axially relative to the flyer for winding coils having varying pitches or turn diameters on successive ledges of the coil form. The provision for this operation is also fully discussed in the aforementioned Smith patent. The last or outer axial tube 17 is, as presented earlier, supported for rotary motion about the axis 15 and does not undergo axial displacement.

In addition to supporting the flyer 13, the flyer drive shaft or outer axial tube 17 supports in a fixed manner an eccentrically mounted rotatable bearing support structure 53 which in turn supports the rotatable races for a pair of rotary bearings 55 and 57. This support structure or frame 53 is canted with respect to the axis 15 having its own axis inclined thereto at an angle of about 5 degrees which, as will be understood, may be varied as desired. The outer races of the bearings 55 and 57 rotatably support a collar 59 to which is affixed an annular member 61 having two oppositely facing meshing means that are illustrated in the form of annular gear teeth as readily seen in FIG. 5. Thus, as so far described, the frame 63 rotates with the tube 17 and due to the canted relationship of the frame 53 relative to the axis 15, the high and low points of the frame 53 relative to the coil form 31, will rotate about the axis 15.

The annular member 61 will execute a wobbling nonrotary motion about the tubular flyer drive shaft 17 as the shaft rotates. This motion is nonrotary because the member 61 is locked against rotation by reason of its engagement with stationary meshing means shown as the face gear 63 secured to the machine frame. The face gear 63 gear surface is substantially perpendicular to and centered about the axis 15. It will be understood that the intermeshing surfaces or teeth on the members 61 and 63 may be a series of spherical protrusions and corresponding shperical indentations or other slip preventing meshing surface configurations.

The first portion of the coil form support member 31 is provided with a meshing surface in the form of a toothed surface 65 of annular configuration which meshes with the lower toothed surface of the annular member 61 as viewed in FIG. 2. By this means, the coil form is restrained from rotating with the flyer assembly.

The flyer 13 is supported on a drum like structure 67 having an end 69. This end 69 is not radially symmetrical but rather, in the position illustrated in FIG. 2, has portions removed to allow the facing teeth of the gears 61 and 65 to intermesh while the diametrically opposite teeth on the gear 61 intermesh with the gear 63. While in this position, there is sufficient room between the face of gear 61 and the gear 65 at the left side of FIG. 2 to allow the wire guide portion of support end 69 to pass between the gears 61 and 65. This portion of end 69 is attached to the flyer drive shaft 17 and the flyer 13. As illustrated, this region between the gears 61 and 65 may be utilized as an open shutter for feeding wire radially outwardly relative to axis 15 and between the gears 61 and 65. The wire feed path 23 extends from the wire source 77 along the flyer drive shaft 17 through the annular gear structure 61 and then radially outwardly along the flyer support 69 to the flyer.

Imagine now that the flyer drive shaft 17, flyer 13, ad all parts mechanically coupled thereto excecute a 180 degrees of revolution about the axis 15 from the position illustrated in FIG. 2. Under these circumstances, the flyer support structure 69 and the radially extending portion of the wire passageway 23 would be on the right-hand side of FIG. 2 as shown in broken lines in FIG. 2 and due to the 180 degrees revolution of the support 53 the annular member 61 would be contacting the gear surface 63 at the right-hand side of FIG. 2 and contacting the gear surface 65 at the left-hand side of FIG. 2. Viewed in this manner, it is readily seen that the supported annular member 61 forms a shutter which rotates synchronously with the flyer assembly. It should also be clear that regardless of the particular rotational orientation of the flyer and related parts the gears 61, 63 and 65 are always intermeshed. Since the annular gear 61 always contacts each of the gears 63 and 65, it prevents rotation of the coil form 31 relative to the frame 11.

Figure 4:
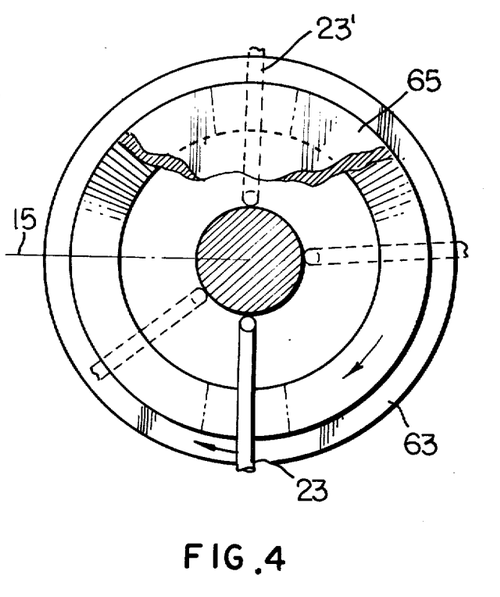
FIG. 4 is a view, partially in section, taken in the direction of the line 4—4 in FIG. 3.
Figure 5:
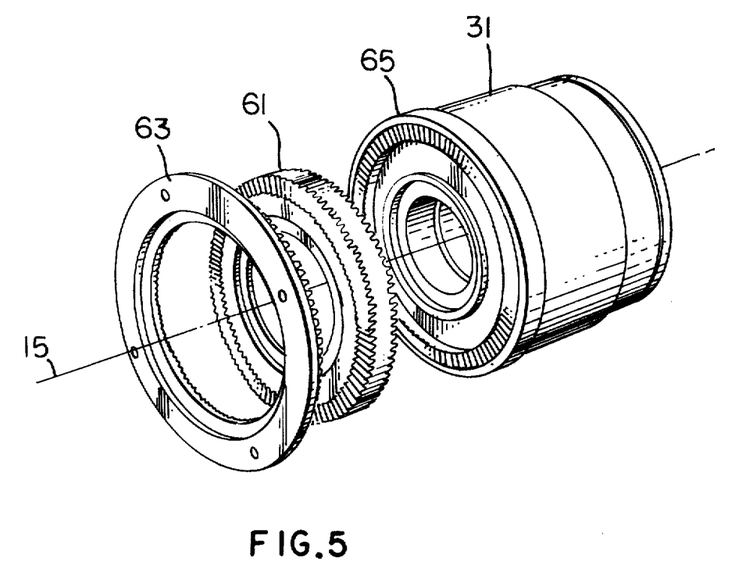
FIG. 5 is an exploded perspective view of the machine elements shown in FIG. 3.

FIGS. 4 and 5 show the flyer drive shaft 17 and the three related annular surfaces 63, 61, 65 which in the present preferred embodiment are gears, in the relative orientation shown in FIG. 1 as well as the orientation 180 degrees removed therefrom and discussed above. These two figures illustrate clearly that at all times the wire passage 23 extends radially between the shutter defining members 61, 65. Thus, a nonrotary wobble motion on the part of the annular member 61 is synchronized with the movement of the wire passage and flyer.

It should now be apparent that preferred mechanisms include a migrating linkage that prevents rotation between two members and yet allows winding material to pass radially outwardly of and between these two members in synchronization with the migration of the linkage.

Numerous modifications of the disclosed preferred embodiment will be apparent to those of ordinary skill in the art having the present disclosure before them.

Figure 6:
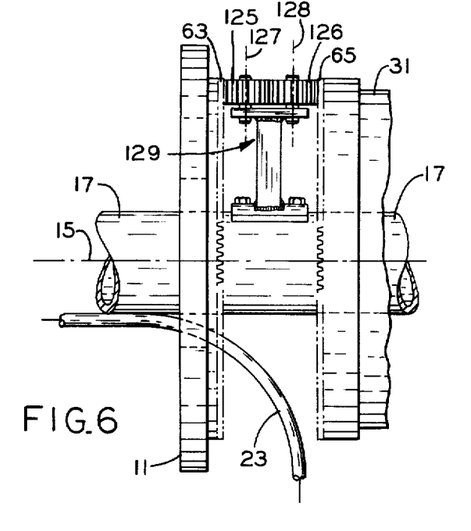
FIGS. 6-10 indicate modifications of a preferred embodiment, FIG. 8 being a view along line 8—8 in FIG. 7, and FIG. 10 being a view along line 10—10 in FIG. 8.

For example, referring to FIG. 4, all four toothed gear surfaces are illustrated as having the same general configuration and pitch, but, the intermeshing portions of gears 61 and 63 might for example have a pitch half that of the intermeshing portions of the gears 61 and 65. Furthermore, as shown in FIG. 6, the gear 61 might be deleted and in its place a pair of intermeshing gears 125, 126 may be provided having two parallel axes 127, 128 that are perpendicular to the machine axis 15. One of these gears 125 would mesh with the gear surface 63 and the other gear 126 would mesh with the gear surface 65. The eccentric carriage 129 for these two gears would, of course, be supported on the flyer drive shaft 17 for rotation therewith so that the axes 127, 128 of the gears 125, 126 would move through two parallel planes perpendicular to the axis 15.

Figure 7:
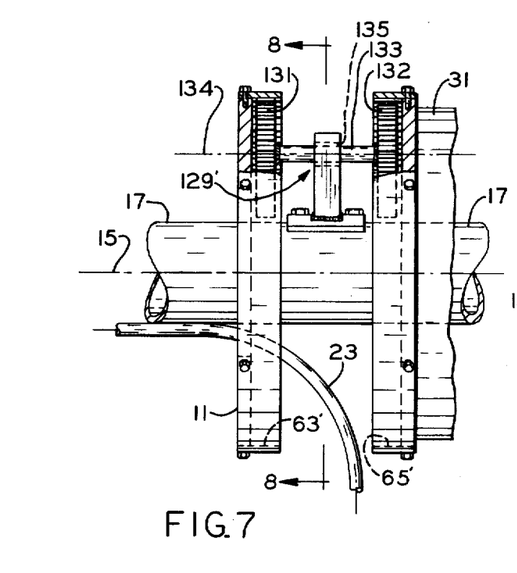
Figure 8:
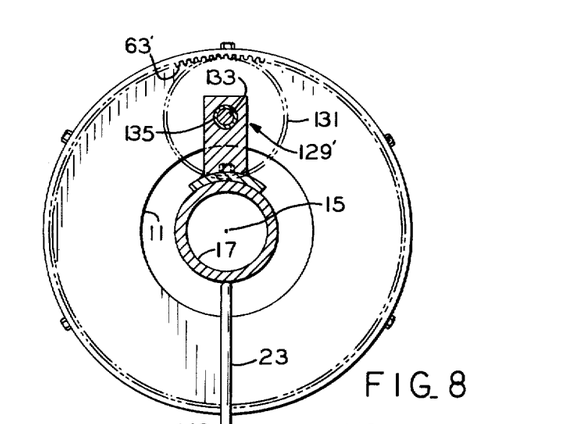

On the other hand, as shown for example in FIGS. 7 and 8, a pair of gears 131, 132 locked or keyed on a common structure such as a shaft 133, which has an axis 134 parallel to but removed from the machine axis 15, could be used so long as the pair of gears is supported by (e.g., carriage 129') and rotates with the flyer structure (e.g., flyer shaft 17); and each meshes with a gear structure on the frame (gear 63') and coil form support (gear 65').

In arrangements just described, at least one pair of gear surfaces may be carried by a single carriage. When the carriage rotates about the machine axis 15 and supports the pair of gears 131, 132 locked on a single shaft parallel to axis 15, the carriage may be part of the flyer structure. In this case, the bearings (e.g. bearing 135) for the common shaft mounted gears will be concentric, but the races for such bearings will be eccentrically located (e.g., offset from) relative to machine axis 15 and any bearing races that are concentric therewith (see bearings 19, 21 in FIG. 2). The same may also be the case when at least one pair of gear surfaces (see 125, 126 in FIG. 6) each rotate about an axis generally normal to a first axis, such as machine axis 15.

In still another form, strain wave gearing techniques may be utilized. For example, a deformable gear might be forced into intermeshing relationship with a nondeformable gear by a gear deformer carried by the flyer mechanism, or a flexible or deformable spline arrangement may be used.

Figure 9:
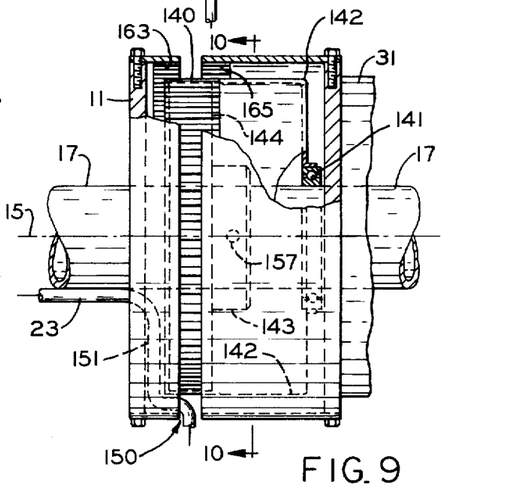
Figure 10:
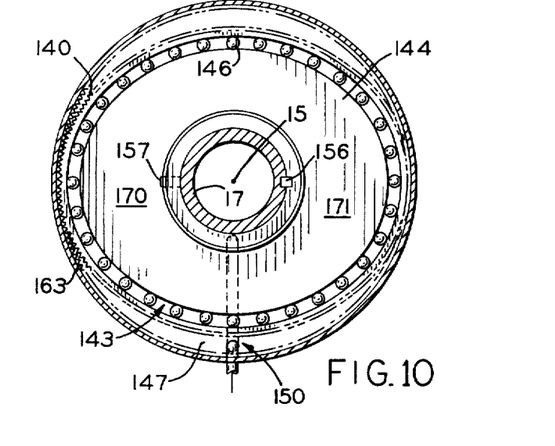

FIGS. 9 and 10 reveal one suitable flexible or deformable spline arrangement wherein a flexible spline 140 is deformed into engagement with axially spaced apart ring gears 163, 165. The spline 140 is a flexible, cylindrical element which is supported, through a high performance flexible cup portion 142 and a bearing 141 pressed onto flyer shaft 17. Bearing 141 is pressed into the hub of cup 142 and thus prevents axial movement of the spline 140 axially relative to flyer shaft 17 and gears 163, 165. The shape of the spline 140, and thus the one or more locations where the spline meshes with the gears 163, 165, is controlled by a deformer or "wave generator" 143.

The wave generator 143 is keyed with (see key 156) and locked to flyer shaft 17 with a set screw 157, and thus constrained to rotate in synchronism with the flyer arm. It will be noted that the outer periphery of the wave generator, rather than being concentric with the axis 15 or with shaft 17, is elliptoidal in shape and thus has, in effect, two lobes 170, 171, (and therefore two eccentric regions). However, for our purposes, a single lobe and single eccentric region could be used, with the result that the spline would engage gears 163, 165 in only one circumferential region at a time.

Figure 3:
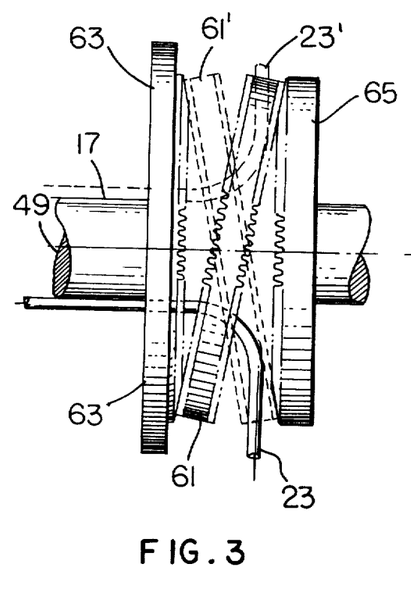
FIG. 3 is a somewhat perspective view representative of the motion which portions of the head shown in FIG. 2 undergo during machine operation.

Preferably, at least some of the elements use in the embodiment of FIGS. 9 and 10 would be purchased from commercial sources. For example, it would be convenient to use (as spline 140 and cup portion 142) an element such as a "Flexspline" of the USM Corporation. "Flexsplines" are used, for example, in that corporation's HDUC series harmonic drive gear reducers. Similarly, the wave generator 143 would, preferably, be a two lobe wave generator from the same company (although a one lobe generator could be used for our purposes). The wave generators used by that company include an elliptoidal cam (e.g., cam 144); and antifriction bearings (e.g., roller or ball bearings 146). As the cam 144 rotates, it deflects the spline 140 into its advancing wave form. The teeth on spline 140 and ring gears or circular splines 163, 165 are cut to the same circular pitch, but the smaller diameter spline has fewer teeth than the circular splines. Thus, the spline 140 may rotate a fraction of a turn for each revolution of shaft 17, but the gear 165 will remain stationary relative to stationary gear 163, and thus member 31 (and winding forms held thereby) will not rotate. This principle of operation can be, perhaps, better understood by referring to FIG. 3 and noting that, when gears 63 and 65 each have a first number of teeth n, and the gears on member 61 each have a different number of teeth [e.g., $(n + 2)$ or $(n + 4)$], the member 61 will rotate about its own axis, but nonetheless "wobble" in synchronism with the flyer shaft 17, so that gear 65 is held stationary ralative to gear 63.

Similarly, even though spline 140 may actually rotate, relative to gears 163, 165, a fraction of a turn during each revolution of flyer shaft 17; at every given instant of such rotation, at least one tooth or groove of spline 140 will be meshed with each of gears 163, 165, and gears 163, 165 will not rotate relative to one another. Thus, it will now be understood that, although spline 140 will "roll" around gears 163, 165; the end result is the same as in the case of the structure of FIG. 3 — whether member 61 is rotating about it axis or not. This is because member 61 in either case executes a wobble motion in synchronism with shaft 17 which motion is, in effect, "rotationless" relative to shaft 17. Similarly, in the case of the structure of FIG. 10, the point of contact between spline 130 and gear 163 undergoes motion about axis 15 in synchronism with shaft 17, and this motion is rotationless at least with respect to shaft 17 as shaft 17 rotates.

Accordingly, a circumferentially located window or shutter 147 will occur between gear 163 and spline 140. This shutter moves in synchronism with shaft 17 and is rotationless relative thereto, and is used as a moving opening (i.e., moving relative to gear 163) through which wire may be fed as wire tube 23 and extended section 150 thereof rotate with the flyer tube 17. More specifically, portion 151 of tube 53 moves between member 11 and the free end of spline 140, and part of the extended section 150 passes along and moves with opening 147. Section 150 is positioned generally radially outwardly from axis 15, as revealed in FIGS. 9 and 10.

In the embodiment of FIGS. 9 and 10, the wave generator 143 constitutes eccentric means, and the flexible spline 140 is movable about such eccentric means.

In a modified form of the structure that has been shown in FIGS. 9 and 10, we would provide spline 140 with the same number of teeth as gear 163; and use a two lobe wave generator to deform the spline. In this modification, the spline would not rotate relative to gear 163 (although the desired rotating window would still be provided), and the spline itself (or cup 142) may be interlocked directly with member 31. In this manner, gear 165 may be dispensed with completely. It should be noted that the diameter of the spline 140 and gear 163 must necessarily be of different diameters when arranged as shown in FIGS. 9 and 10. Thus, when the same number of teeth are provided on spline 140 and gear 163, the teeth on one of these members must have a tooth profile slightly smaller than the tooth profile for the other member.

While we have shown and described what at least are considered to be preferred and alternate embodiments of our invention in accordance with the Patent Statutes, changes may be made therein without actually departing from the true spirit and scope of the invention. Accordingly, the following claims are intended to cover all such equivalent variations as fall within the invention.

What we claim as new and desire to secure by Letters Patent of the United States is:

1. A mechanism for use in apparatus utilized while developing turns of winding material for ultimate assembly with a magnetic core, the mechanism including winding turn receiving means, a device, including shaping means, locked against rotation relative to the winding turn receiving means for at least assisting in the formation of winding turns; a flyer mechanism rotatable about the shaping means about a first axis of rotation for developing winding turns about the first axis of rotation; at least one winding material guide means for at least assisting in directing winding material in a direction generally radially relative to the first axis of rotation; at least one nonrotating locking member; at least one movable locking mechanism interconnecting said nonrotating locking member and said device so that said device is locked against rotation about the first axis of rotation during movement of the flyer mechanism and for establishing an unobstructed generally radially directed shutter passage, continuously movable along a predetermined path in synchronism with the flyer means, through which winding material may be fed generally radially relative to the first axis of rotation; said locking mechanism including first and second gear surfaces spaced axially apart along the first axis of rotation and a carriage controlling the instantaneous location of the first and second gear surfaces relative to said device and said nonrotatable locking member; said mechanism providing a first wire path extending in a generally axial direction relative to the first axis of rotation and a second wire path extending in a generally radial direction relative to the first axis of rotation; said shaping means having different portions for developing, in co-operation with the flyer means, winding turns of at least two different diameters, said shaping means being movable axially relative to the turn receiving means and to the nonrotating locking member; and means for effecting axial movement of the shaping means relative to the turn receiving means during development of at least two winding turns of different diameters so that winding turns of different diameters are successively movable into the turn receiving means during rotation of the flyer mechanism.

2. A mechanism for a winding machine used when generating turns of winding material; the mechanism comprising form means movable axially relative to a flyer assembly, and coil receiving means, the form means being of different sizes at different parts thereof so that winding turns of different diameters may be formed thereabout; winding turn placing means including a flyer assembly having a flyer arm rotatable in a predetermined path for feeding winding material from a winding material passage having a first portion extending in a first longitudinal direction, and a second portion located axially between two parts of the mechanism and extending generally radially relative to the first longitudinal direction; said form means including a portion located axially beyond the second portion of the passage; locking means for preventing rotation of the form means while establishing a moving path along which winding material can move to the flyer arm; said locking means including a first gear surface adapted to be held against rotation, a second gear surface interconnected with said coil form, and interconnected gear means extending a predetermined longitudinal distance between the first and second gear surfaces; said first and second gear surfaces being longitudinally spaced apart approximately the same predetermined longitudinal distance and the interconnected gear means instantaneously meshing with portions of the first and second gear surfaces; and means for causing axial movement of the form means relative to the flyer assembly, locking means, and coil receiving means, so that winding turns of different diameters are moved successively into the receiving means during rotation of the flyer arm.

3. A mechanism for use in apparatus utilized while developing turns of winding material for ultimate assembly with a magnetic core, the mechanism including winding turn receiving means, a device, including shaping means, locked against rotation relative to the winding turn receiving means for at least assisting in the formation of winding turns; a flyer mechanism rotatable about the shaping means about a first axis of rotation for developing winding turns about the first axis of rotation; at least one winding material guide means for at least assisting in directing winding material from a first region proximate to the first axis to a second region spaced a different radial distance from the first axis than the first region; at least one nonrotating locking member; at least one movable locking mechanism interconnecting said nonrotating locking member and said device so that said device is locked against rotation about the first axis of rotation during movement of the flyer mechanism and for establishing an unobstructed passage, continuously movable along a predetermined path in synchronism with the flyer means, through which winding material may be fed from the first region to the second region; said locking mechanism including first and second gear surfaces spaced axially apart along the first axis of rotation; said mechanism providing a first wire path extending in a generally axial direction relative to the first axis of rotation and a second wire path extending from the first region to the second region; said shaping means having different portions for developing, in cooperation with the flyer means, winding turns for at least two different coils, said shaping means being movable axially relative to the turn receiving means and to the nonrotating locking member; and means for effecting axial movement of the shaping means relative to the turn receiving means during development of at least two different coils so that winding turns of different coils are successively movable into the turn receiving means during rotation of the flyer mechanism.

4. A mechanism for a winding machine used when generating turns of winding material; the mechanism comprising form means movable axially relative to a flyer assembly, and coil receiving means, the form means being of different sizes at different parts thereof so that winding turns of different diameters may be formed thereabout; winding turn placing means including a flyer assembly having a flyer arm rotatable about a first axis and in a predetermined path for feeding winding material from a winding material passage having a first portion along a first region, and a second portion located along a second region spaced a different radial distance from the first axis than the first region; said form means including a portion located axially beyond the second portion of the passage; locking means for preventing rotation of the form means and permitting movement of winding material from the first region to the flyer arm; said locking means including a first gear surface adapted to be held against rotation, a second gear surface interconnected with said coil form, and interconnected gear means extending a predetermined longitudinal distance between the first and second gear surfaces; said first and second gear surfaces being longitudinally spaced apart approximately the same predetermined longitudinal distance and the interconnected gear means instantaneously meshing with portions of the first and second gear surfaces; and means for causing axial movement of the form means relative to the flyer assembly, locking means, and coil receiving means, so that winding turns of different diameters are moved successively into the receiving means during rotation of the flyer arm.

5. A mechanism for use in apparatus utilized while developing turns of winding material for ultimate assembly with a magnetic core, the mechanism including winding turn receiving means, a device, including shaping means, locked against rotation relative to the winding turn receiving means for at least assisting in the formation of winding turns; a flyer mechanism rotatable about the shaping means about a first axis of rotation for developing winding turns about the first axis of rotation; at least one winding material guide means for at least assisting in directing winding material from a first region to a second region spaced a different radial distance from the first axis than the first region; at least one nonrotating locking member; at least one movable locking mechanism interconnecting said nonrotating locking member and said device so that said device is locked against rotation about the first axis of rotation during movement of the flyer mechanism and for establishing an unobstructed passage, continuously movable along a predetermined path in synchronism with the flyer means, through which winding material may be fed from the first region to the second region; said locking mechanism including a surface meshing with said nonrotating locking member to prevent slippage therebetween; said mechanism providing a fist wire path extending in a generally axial direction relative to the first axis of rotation and a second wire path extending from the first region to the second region; said shaping means having a portion for developing, in cooperation with the flyer means, a number of winding turns; said shaping means being movable axially relative to the turn receiving means and to the nonrotating locking member; and means for effecting axial movement of the shaping means relative to the turn receiving means during rotation of the flyer mechanism.

6. The invention of claim 5 wherein the nonrotating locking member comprises a first toothed member; the locking mechanism comprises a flexible toothed member and eccentric means rotatable about the first axis for deforming the flexible toothed member into engagement with the first toothed member; the flyer mechanism includes a wire guiding portion movable in synchronism with the eccentric means; and the flexible toothed member interacts with said device to inhibit rotation of said device relative to the first toothed member.

7. The invention of claim 6 wherein the flexible toothed member is provided with a first number of teeth; the first toothed member is provided with the same number of teeth as the flexible toothed member whereby relative rotation between the flexible toothed member and first toothed member is prevented; and said device is interconnected with the flexible toothed member.

8. The invention of claim 7 wherein the flexible toothed member comprises a flexible spline and a cup portion, and said device is interconnected with said cup portion.

9. A mechanism for a winding machine used when generating turns of winding material; the mechanism comprising form means movable axially relative to a rotatable flyer assembly during rotation thereof, and coil receiving means; winding turn placing means including a flyer assembly having a flyer arm rotatable in a predetermined path about a first axis for feeding winding material from a winding material passage having a first portion along a first region, and a second portion located along a second region spaced a different radial distance from the first axis than the first region; said form means including a portion located axially beyond the second portion of the passage; locking means for preventing rotation of the form means and permitting movement of winding material from the first region to the second region; said locking means including a first gear surface adapted to be held against rotation, a second gear surface interconnected with said coil form, and interconnected gear means extending a predetermined longitudinal distance between the first and second gear surfaces; said first and second gear surfaces being longitudinally spaced apart approximately the same predetermined longitudinal distance, and the interconnected gear means instantaneously meshing with portions of the first and second gear surfaces; and means for causing axial movement of the form means relative to the flyer assembly, locking means, and coil receiving means, so that successively formed winding turns are moved successively into the receiving means during rotation of the flyer arm.

10. The invention of claim 9 wherein: the interconnected gear means comprise third and fourth gear surfaces interconnected together to prevent relative rotation therebetween; said first and second gear surfaces comprise first and second gears that extend circumferentially around the first axis, with the first axis passing through the geometric center for the first and second gears; said third and fourth gear surfaces being disposed circumferentially about a second axis; and wherein the second axis and first axis are oriented relative to one another as to be not coincident.

11. The invention of claim 9 wherein the interconnected gear means comprise third and fourth gear surfaces interconnected together to prevent relative rotation therebetween; said first and second gear surfaces extend circumferentially around the first axis, with the first axis centrally located relative to the first and second gear surfaces; said third and fourth gear surfaces are both disposed circumferentially about a second axis; and said third and fourth gear surfaces are supported in eccentric relation to the first axis.

12. The invention of claim 11 wherein the third and fourth gear surfaces move relative to the first axis as the flyer rotates.

13. The invention of claim 12 wherein the third and fourth gear surfaces are free to rotate about the second axis.

14. The invention of claim 13 wherein the second axis is not coincident with the first axis.

15. The invention of claim 11 wherein the third and fourth gear surfaces form part of a wobble mechanism; the third gear surface meshes with the first gear surface; the fourth gear surface meshes with the second gear surface; and the number of teeth forming the first gear surface is less than the number of teeth forming the third gear surface.

16. The invention of claim 15 wherein the third and fourth gear surfaces wobble about the first axis, and rotate about the second axis.

17. The invention of claim 13 wherein the third and fourth gear surfaces are interconnected with the flyer arm, and move relative to the first axis as the flyer rotates.

18. The invention of claim 12 wherein the third and fourth gear surfaces are supported by at least one bearing and are comprised of gear portions that are locked against rotation relative to one another and that rotate about the second axis as the flyer arm rotates; and wherein said at least one bearing is eccentrically located relative to the second axis.

19. The invention of claim 12 further including eccentric means movable in synchronism with the flyer, and wherein the location of interengagement of the third and fourth gear surfaces with the first and second gear surfaces, respectively, is controlled by the eccentric means.

* * * * *